(12) United States Patent
Na et al.

(10) Patent No.: US 9,625,762 B2
(45) Date of Patent: Apr. 18, 2017

(54) LIQUID CRYSTAL DISPLAY DEVICE

(71) Applicant: Samsung Display Co., Ltd., Yongin (KR)

(72) Inventors: Gwan-Young Na, Yongin (KR); Kwang-Hyun Kim, Yongin (KR); Sang-Jae Kim, Yongin (KR); Ji-Hye Kim, Yongin (KR); Teck-Soo Kim, Yongin (KR); Hyoung-Joo Lee, Yongin (KR); Seon-Ah Cho, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/714,737

(22) Filed: May 18, 2015

(65) Prior Publication Data
US 2016/0041426 A1     Feb. 11, 2016

(30) Foreign Application Priority Data

Aug. 5, 2014 (KR) .................. 10-2014-0100549

(51) Int. Cl.
*G02F 1/1335* (2006.01)
*G02F 1/13363* (2006.01)

(52) U.S. Cl.
CPC .... *G02F 1/133536* (2013.01); *G02F 1/13363* (2013.01)

(58) Field of Classification Search
CPC .................................................. G02F 1/13363
See application file for complete search history.

(56) References Cited

U.S. PATENT DOCUMENTS

| 5,619,356 | A | 4/1997 | Kozo et al. |
| 6,184,955 | B1 | 2/2001 | Okumura |
| 7,385,763 | B2 | 6/2008 | Nevitt et al. |
| 7,443,585 | B2 | 10/2008 | Hara et al. |
| 7,492,516 | B2 | 2/2009 | Takahashi et al. |
| 7,531,234 | B2 | 5/2009 | Nakamura et al. |
| 7,557,989 | B2 | 7/2009 | Cross et al. |

(Continued)

FOREIGN PATENT DOCUMENTS

| CN | 101410738 | 4/2009 |
| CN | 101506699 | 8/2009 |

(Continued)

OTHER PUBLICATIONS

Extended European Search Report dated on Feb. 10, 2014 in European Patent Application No. 13163667.2-1904.

(Continued)

*Primary Examiner* — Timothy L Rude
(74) *Attorney, Agent, or Firm* — H.C. Park & Associates, PLC

(57) ABSTRACT

Disclosed is a liquid crystal display device, including: first and second substrates, which are spaced apart from each other by a predetermined interval while facing each other; a reflective polarizing plate disposed under the first substrate, and including a first refractive index layer and a second refractive index layer, which have different refractive indexes and are repeatedly stacked; first and second compensation layers sequentially stacked on the second substrate, and an upper polarizing plate including a polarizing layer formed on the second compensation layer; and a liquid crystal layer formed between the first and second substrates.

11 Claims, 3 Drawing Sheets

(56) References Cited

U.S. PATENT DOCUMENTS

| | | | |
|---|---|---|---|
| 7,724,434 B2 | 5/2010 | Cross et al. | |
| 7,791,687 B2 | 9/2010 | Weber et al. | |
| 7,932,975 B2 | 4/2011 | Sakai et al. | |
| 8,035,774 B2 | 10/2011 | Ouderkirk et al. | |
| 8,223,295 B2* | 7/2012 | Sato ................... | G02B 5/286 349/61 |
| 9,097,933 B2* | 8/2015 | Ki ....................... | G02B 5/3041 |
| 2006/0104088 A1* | 5/2006 | Gon ................... | G02F 1/133615 362/607 |
| 2007/0008459 A1 | 1/2007 | Park et al. | |
| 2007/0236636 A1 | 10/2007 | Watson et al. | |
| 2007/0264447 A1 | 11/2007 | Oya et al. | |
| 2008/0057277 A1 | 3/2008 | Bluem et al. | |
| 2008/0151147 A1* | 6/2008 | Weber ................ | G02B 5/305 349/96 |
| 2010/0157195 A1 | 6/2010 | Miyatake et al. | |
| 2010/0157207 A1* | 6/2010 | Lee .................... | G02F 1/13363 349/96 |
| 2010/0231831 A1 | 9/2010 | Miyatake et al. | |
| 2010/0283949 A1 | 11/2010 | Uchiyama et al. | |
| 2014/0139787 A1 | 5/2014 | Ki et al. | |
| 2014/0192297 A1* | 7/2014 | Choi .................. | G02F 1/13363 349/96 |
| 2014/0293201 A1* | 10/2014 | Takeda .............. | B32B 27/302 349/118 |
| 2015/0234106 A1* | 8/2015 | Nakamura .......... | G02B 5/3083 349/96 |

FOREIGN PATENT DOCUMENTS

| | | |
|---|---|---|
| CN | 101680990 | 3/2010 |
| JP | 08-122756 | 5/1996 |
| JP | 2002-139622 | 5/2002 |
| JP | 2006-099139 | 4/2006 |
| JP | 2007-233244 | 9/2007 |
| JP | 2007-298634 | 11/2007 |
| JP | 2008-241893 | 10/2008 |
| JP | 2008-242047 | 10/2008 |
| JP | 2009-047802 | 3/2009 |
| JP | 4612562 | 10/2010 |
| JP | 4746475 | 5/2011 |
| JP | 4939059 | 3/2012 |
| KR | 10-0558161 | 2/2006 |
| KR | 10-2007-0117821 | 12/2007 |
| KR | 10-2010-0009510 | 1/2010 |
| KR | 10-0971105 | 7/2010 |
| KR | 10-2010-0089598 | 8/2010 |
| KR | 10-2010-0106838 | 10/2010 |
| KR | 10-0989046 | 10/2010 |
| KR | 10-2011-0066255 | 6/2011 |
| KR | 10-2011-0070576 | 6/2011 |
| TW | 200837405 | 9/2008 |
| TW | 200912405 | 3/2009 |
| WO | 01/38907 | 5/2001 |

OTHER PUBLICATIONS

Non-Final Office Action dated Nov. 14, 2014 in U.S. Appl. No. 13/846,018.

Notice of Allowance dated Mar. 31, 2015 in U.S. Appl. No. 13/846,018.

Chinese Office Action issued on Nov. 1, 2016, in Chinese Patent Application No. 20130222652.5.

* cited by examiner

FIG. 5
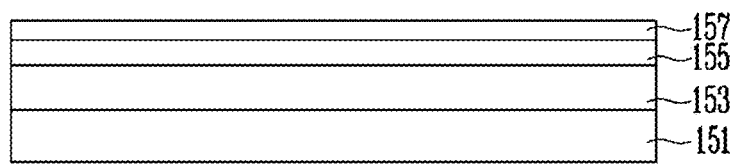
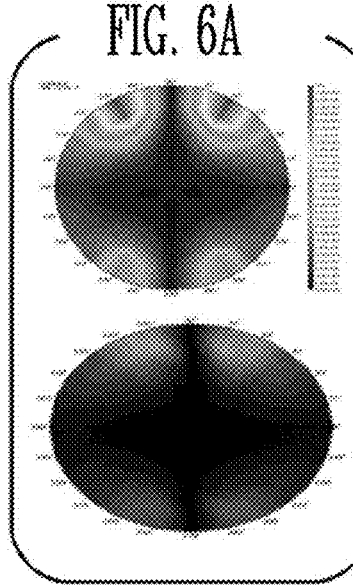
FIG. 6A
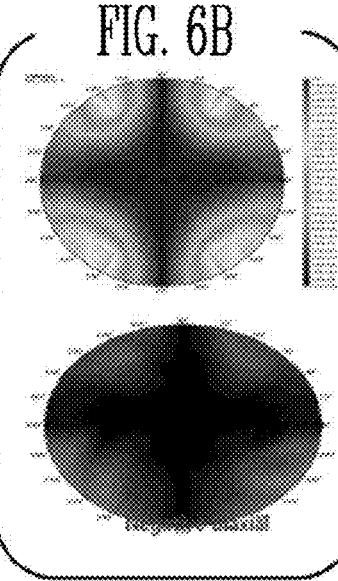
FIG. 6B
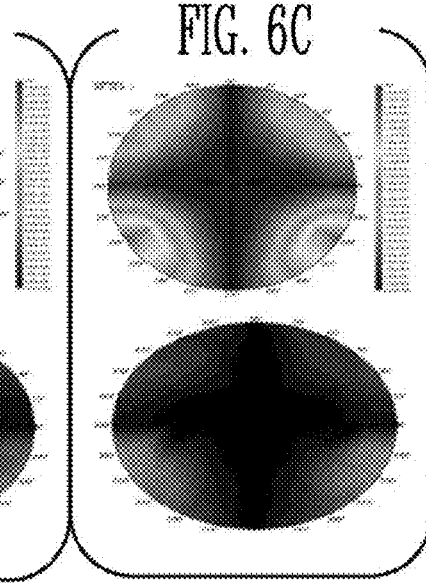
FIG. 6C

LIQUID CRYSTAL DISPLAY DEVICE

CROSS-REFERENCE TO RELATED APPLICATION

This application claims priority to and the benefit of Korean Patent Application No. 10-2014-0100549, filed on Aug. 5, 2014, which is incorporated by reference for all pruposes as if fully set forth herein.

BACKGROUND

Field

Exemplary embodiments of the present invention relate to a liquid crystal display device.

Discussion of the Background

A liquid crystal display device includes two substrates, on which electric field generating electrodes, such as a pixel electrode and a common electrode, are formed, and a liquid crystal layer interposed between the two substrates. The liquid crystal display device generates an electric field in the liquid crystal layer by applying a voltage to the electric field generating electrode, determines an alignment of liquid crystal molecules of the liquid crystal layer through the generated electric field, and controls polarization of incident light to display an image.

The liquid crystal display device may be categorized as a transmissive liquid crystal display device for displaying an image by using a back light, a reflective liquid crystal display device for displaying an image by using natural external light, and a transflective liquid crystal display device operated in a transmissive type or a reflective type.

Since about 50% of light incident from the back light is absorbed by a polarizing plate attached to a lower part of the liquid crystal display device in a liquid crystal display device using the back light, light efficiency may deteriorate thereby degrading display brightness.

A reflective polarizing plate including first and second layers having different refractive indexes which are repeatedly stacked to allow some light to pass through and allow remaining light to be reflected, thereby improving efficiency of light provided from the backlight, may be used instead of the lower polarizing plate.

Since the first and second layers have different refractive indexes in a reflective polarizing plate, a refractive index in one axis direction among three axes directions may be different. For example, when the first layer is an isotropic thin film and the second layer is a one-axis isotropic thin film, the refractive indexes in the y and z axis directions are the same as each other, but the refractive index in the x-axis direction is different.

Accordingly, it is possible to improve efficiency of light by reflecting light in the x-axis direction incident from the back light and allowing light in the y-axis direction to pass through.

The above information disclosed in this Background section is only for enhancement of understanding of the background of the inventive concept, and, therefore, it may contain information that does not form the prior art that is already known in this country to a person of ordinary skill in the art.

SUMMARY OF THE INVENTION

An exemplary embodiment of the present invention provides a liquid crystal display device capable of improving light efficiency and minimizing a reddish phenomenon.

Additional aspects will be set forth in the detailed description which follows, and, in part, will be apparent from the disclosure, or may be learned by practice of the inventive concept.

An exemplary embodiment of the present invention provides a liquid crystal display device including: a first substrate and a second substrate, the first and second substrates facing each other at a predetermined interval; a reflective polarizing plate disposed under the first substrate; a first compensation layer and a second compensation layer sequentially disposed on the second substrate; an upper polarizing plate comprising a polarizing layer disposed on the second compensation layer; and a liquid crystal layer disposed between the first and second substrates.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept

FIG. 5 is a detailed cross-sectional view of an upper polarizing plate of FIG. 1 according to an exemplary embodiment of the present invention.

FIGS. 6A, 6B, and 6C are diagrams illustrating characteristics of a liquid crystal display device according to an exemplary embodiment of the present invention.

DETAILED DESCRIPTION OF THE ILLUSTRATED EMBODIMENTS

Figure 1:
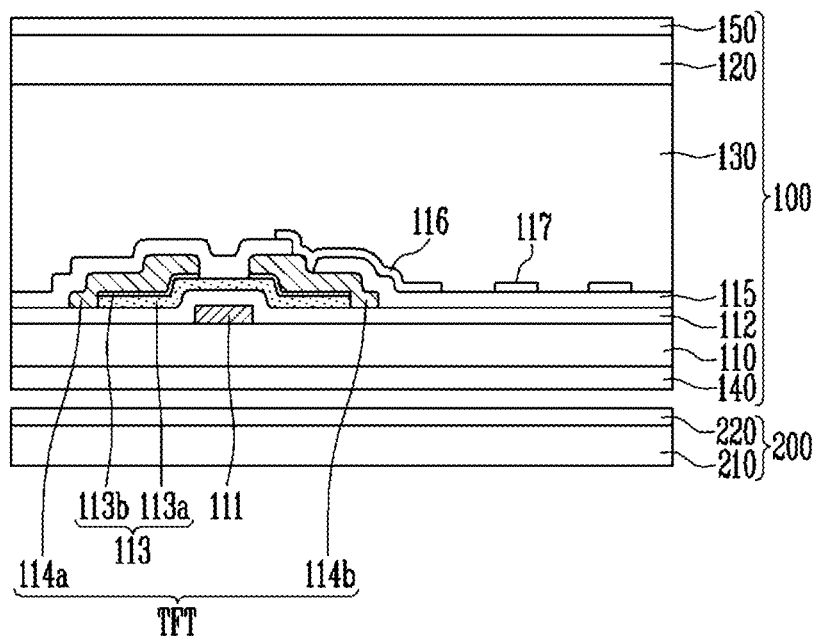
FIG. 1 is a cross-sectional view schematically illustrating a liquid crystal display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a cross-sectional view schematically illustrating a liquid crystal display device according to an exemplary embodiment of the present invention.

Referring to FIG. 1, a liquid crystal display device according to an exemplary embodiment of the present invention includes a liquid crystal display panel 100 for displaying an image, and a backlight unit 200 for irradiating light to the liquid crystal display panel 100.

The backlight unit 200 includes a backlight 210 including a light source for generating light, and an optical sheet 220 that may improve a feature of the light generated by the backlight 210 to irradiate the light to the liquid crystal display panel 100.

A fluorescent lamp, such as a Cold Cathode Fluorescent Lamp (CCFL), or a light emitting diode, such as a Light Emitting Diode (LED), may be used as the light source, and the light source may be positioned on a lateral surface or a lower surface of the backlight 210.

The optical sheet 220 may include one or more optical sheets, and may include a prism sheet or a diffusion sheet.

The liquid crystal display panel 100 includes first and second substrates 110 and 120, which are spaced apart from each other by a predetermined interval while facing each other, a liquid crystal layer 130 interposed between the first and second substrates 110 and 120, a lower polarizing plate 140 formed or disposed under the first substrate 110, and an upper polarizing plate 150 formed or disposed on the second substrate 120.

The first substrate 110 may be formed of materials such as transparent glass or plastic for example, and may include a thin film transistor TFT, a pixel electrode 116 connected to the thin film transistor TFT, and a common electrode 117 to form a horizontal electric field with the pixel electrode 116.

The thin film transistor TFT includes a gate electrode 111 formed or disposed on the first substrate 110, a gate insulating layer 112 formed or disposed on the gate electrode 111, a semiconductor layer 113 formed or disposed on the gate insulating layer 112, and source and drain electrodes 114a and 114b formed or disposed on the semiconductor layer 113.

The semiconductor layer 113 has a stack structure in which an active layer 113a that may be formed of an amorphous silicon material and an ohmic contact layer 113b that may be formed of an impurity amorphous silicon material are sequentially stacked. Aspects of the invention are not limited thereto, and the active layer 113a and the ohmic contact layer 113b may be formed of other materials.

A passivation layer 115 is disposed on the source and drain electrodes 114a and 114b of the thin film transistor TFT, and the pixel electrode 116 and the drain electrode 117, which form a horizontal electric field, are disposed on the passivation layer 115 while being spaced apart from each other by a predetermined interval.

The second substrate 120 is formed of, for example, transparent glass or plastic, and may include a color filter (not shown) to implement a color.

The liquid crystal layer 130 may include an in-plane based liquid crystal which forms at least one pair of electrodes (the pixel electrode 116 and the common electrode 117) arranged in parallel on the first substrate 110 to form a transverse electric field substantially parallel to the first substrate 110. For example, a liquid crystal in a Plane to Line Switching (PLS) mode may be used as the liquid crystal layer 130.

Figure 2:
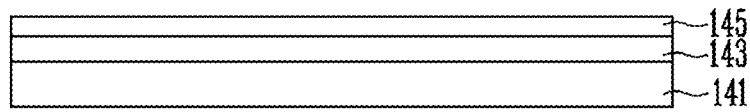
FIG. 2 is a detailed cross-sectional view of a lower polarizing plate of FIG. 1 according to an exemplary embodiment of the present invention.

As illustrated in FIG. 2, the lower polarizing plate 140 includes a reflective polarizing plate 141, in which two layers having different refractive indexes are stacked, a first passivation layer 143 disposed on the reflective polarizing plate 141, and an adhesive layer 145 disposed on the first passivation layer 143.

Figure 3:
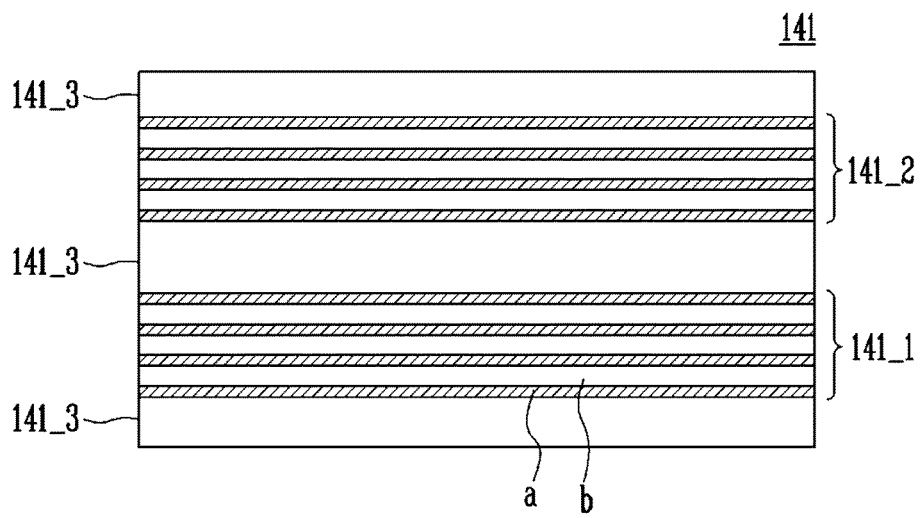
FIG. 3 is a detailed cross-sectional view of a reflective polarizing plate of FIG. 2 according to an exemplary embodiment of the present invention.

As illustrated in FIG. 3, the reflective polarizing plate 141 includes first and second group layers 141_1 and 141_2, in which first and second refractive index layers a and b having different refractive indexes are repeatedly stacked.

The first and second group layers 141_1 and 141_2 have a structure in which the first refractive index layer a (polymer A) and the second refractive index layer b (polymer B) are repeatedly and/or alternately stacked. The number of total refractive index layers a and b may vary depending on an exemplary embodiment, for example, the number of total layers may be 275.

The first refractive index layer a (polymer A) may be formed to be relatively thinner, and the second refractive index layer b (polymer B) may be formed to be relatively thicker. Depending on the material, the first refractive index layer a (polymer A) may be thicker than the second refractive index layer b (polymer B), and the second refractive index layer b (polymer B) may be thicker than the first refractive index layer a (polymer A). A refractive index of the first refractive index layer a (polymer A) may be greater than that of the second refractive index layer b (polymer B).

The difference in the refractive index between the first refractive index layer a (polymer A) and the second refractive index layer b (polymer B) may allow different refractive index in one axis direction among the three axis directions.

Buffer layers 141_3 are positioned in spaces between the first and second group layers 141_1 and 141_2 and at outer sides of the first and second group layers 141_1 and 141_2. The buffer layer 141_3 may be formed by the second refractive index layer b (polymer B) having a smaller refractive index, and may protect, support, or connect the first and second group layers 141_1 and 141_2.

The first passivation layer 143 is disposed on the reflective polarizing plate 141 and may protect the reflective polarizing plate 141. The first passivation layer 143 may be selected from one of cellulose triacetate (TAC), cyclo olefin polymer (COP), poly ethylene terephthalate (PET), poly propylene (PP), polycarbonate (PC), poly sulfone (PSF), and poly methyl methacrylate (PMMA), and tri acetyl cellulose (TAC).

The first passivation layer 143 may have a varying retardation value in a thickness direction according to a thickness thereof. Accordingly, when a value of a phase difference Rth in the thickness direction to be compensated is determined, the first passivation layer 143 is formed in a thickness according to the determined value of the phase difference Rth. An external surface of the first passivation layer 143 may be surface processed, for example, anti-glare or anti-reflection processed.

The lower polarizing plate 140 is attached onto a rear surface of the first substrate 110, and may include an adhesive layer 145 for attachment.

Figure 4:
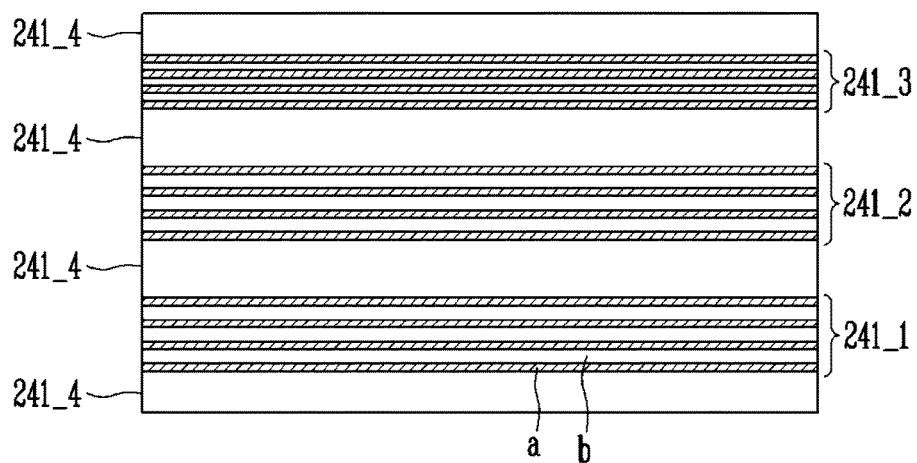
FIG. 4 is a cross-sectional view illustrating a reflective polarizing plate of FIG. 2 according to an exemplary embodiment of the present invention.

FIG. 4 is a cross-sectional view illustrating a reflective polarizing plate according to an exemplary embodiment of the present invention.

Referring to FIGS. 2 and 4, a reflective polarizing plate 241 according to an exemplary embodiment of the present invention includes first to third group layers 241_1 to 241_3 in which first and second refractive index layers a and b having different refractive indexes are repeatedly and/or alternatingly formed or stacked.

The first to second group layers 241_1 and 241_2, and the third group layer 241_3 may have different optical features. A phase difference of one or more corresponding layers configuring the first to second group layers 241_1 and 241_2, and the third group layer 241_3 may be different.

The second refractive index layer b (polymer B) may be formed to be thicker than the first refractive index layer a (polymer A) in the first and second group layers 241_1 and 241_2. The first refractive index layer a (polymer A) and the second refractive index layer b (polymer B) may be formed to have the same thickness in the third group layer 241_3.

Since the first refractive index layer a (polymer A) and the second refractive index layer b (polymer B) have different thicknesses, retardation provided in each layer and the optical feature is different. The first refractive index layer a (polymer A) and the second refractive index layer b (polymer B) may have a difference in only the refractive index in one axis direction among the three axis directions.

The first and second group layers 241_1 and 241_2 are disposed under the reflective polarizing plate 241, and have a reflective polarizing feature. The light provided from the backlight unit 200 may be partly reflected, and the remaining polarized light passes through. The first and second group layers 241_1 and 241_2 having the same structure are sequentially disposed within the reflective polarizing plate 241 which may increase the reflection polarizing feature.

The third group layer 241_3 is disposed on the reflective polarizing plate 241, and has a feature of reflective polarization and a feature of a compensation film. Light passing through the lower first and second groups layers 241_1 and 242_2 is light of a specific polarization component, and when the light is incident to the third group layers 241_3, additional retardation is provided to the third group layer 241_3 by a layer structure having a different refractive index from that of the first and second group layers 241_1 and 241_2, so that the third group layer 241_3 may have an effect of the compensation film.

Since the polarization feature of the light incident to the third group layer 241_3 is in a good state by the first and second group layers 241_1 and 241_2, the third group layer 241_3 providing an additional phase difference (retardation) is closely disposed to the liquid crystal layer 120.

Buffer layers 241_4 may be positioned between the first to third group layers 241_1 to 241_3 and at external sides of the first to third group layers 241_1 to 241_3. The buffer layer 241_4 may be formed by the second refractive index layer b (polymer B having a smaller refractive index) among the two layers a and b, belonging to the first to third group layers 241_1 to 241_3. The buffer layer 241_4 may protect or connect the first to third group layers 241_1 to 241_3.

Herein after, an upper polarization plate 150 will be described.

FIG. 5 is a detailed cross-sectional view of the upper polarizing plate of FIG. 1.

Referring to FIGS. 1 and 5, the upper polarizing plate 150 includes a first compensation layer 151, a second compensation layer 153 formed on the first compensation layer 151, a polarizer 155 formed on the second compensation layer 153, and a second passivation layer 157 formed on the polarizer 155.

The polarizer 155 may be formed by dyeing a poly vinyl alcohol film with, for example, iodine, and elongating the poly vinyl alcohol film in a specific direction. The polarizer 155 may absorb light in the elongation direction and may allow light in a direction vertical to the elongation direction to pass through to polarize light. Particularly, the polarizer 155 may have a phase difference in a thickness direction, the z-axis direction, and may allow light incident from the rear surface thereof, light in the direction vertical to the elongation direction, to pass through to polarize the light. Particularly, the polarizer 155 may have a phase difference in a thickness direction, the z-axis direction, and when light incident from the rear surface thereof is light in the direction vertical to the elongation direction, the polarizer 155 may make the light move in the z-axis.

The second passivation layer 157 is disposed on an entire surface of the polarizer 155 and may protect the polarizer 155. The second passivation layer 157 may protect the polarizer 155 and may improve the implementation of a wide view angle by assisting the first compensation layer 153 from the second passivation layer 157 may be made of one of the group consisting of cellulose triacetate (TAC), cyclo olefin polymer (COP), poly ethylene terephthalate (PET), poly propylene (PP), polycarbonate (PC), poly sulfone (PSF), and poly methyl methacrylate (PMMA), and tri acetyl cellulose (TAC).

An external surface of the second passivation layer 157 may be surface processed, for example, anti-glare or anti-reflection processed.

The first compensation layer 151 may be formed of a positive (+) C plate bi-axially stretched by making a material having a negative refractive index feature (the refractive index may become small in the elongation direction) into a film.

The first compensation layer 151 formed by the positive (+) C plate is disposed on an upper surface of the liquid crystal display panel 100, so that a movement axis of the light incident through the liquid crystal display panel 100 heads towards a thickness direction of the first compensation layer 151, the z-axis direction. In the first compensation layer 151, values of phase differences in the x-axis along a first direction of a surface and the y-axis along a second direction may be set to be equal, and a value of a phase difference in the z-axis may be set to be greater than the value of the phase difference of the x-axis and the y-axis.

For example, the value of the phase difference in the x-axis and the y-axis may indicate a refractive index of a surface type having an angle of 90°, and the value of the phase difference in the z-axis may indicate a refractive index in the thickness direction of the first compensation layer 151.

The movement axis of the light passing through the first compensation layer 151 may be the z-axis. The value of the phase difference Rth in the thickness direction (the phase difference in the z-axis direction) of the first compensation layer 151 may be set to have a value in the range of −200 nm to −40 nm.

The second compensation layer 153 may be formed of a negative (−) B plate to convert a movement axis of the light moving toward the z-axis through the first compensation layer 151 into the x-axis.

A value of the phase difference Rth (the phase difference in the z-axis direction) of the second compensation layer 153 may be set to have a value in the range of 40 nm to 160 nm, and a value of a phase difference Ro in a front direction may also be set to have a value in the range of 40 nm to 160 nm.

The first and second compensation layers 151 and 153 may be manufactured by, for example, a UV cured liquid crystal film, polycarbonate, poly ethylene terephthalate, polystyrene, uniaxial stretched Tri-Acetyl Cellulose (TAC), uniaxial stretched polynorbornene (PNB), biaxial stretched polycarbonate (PC), biaxial stretched COP, and biaxial liquid crystal film, and tri acetyl cellulose (TAC).

In the first and second compensation layers 151 and 153, the phase difference exhibits a reverse wavelength distribution feature. The "reverse wavelength distribution feature" may be a wavelength feature in which in the visual ray wavelength region (400 nm≤λ≤700 nm), when a wavelength becomes shorter, an absolute value of the phase difference becomes smaller, and when a wavelength becomes longer, an absolute value of the phase difference becomes greater.

In the meantime, in order to decrease an interference color generated on a lateral surface of the liquid crystal display device, the liquid crystal display device according to an exemplary embodiment of the present invention may use the reflective polarizing plates 141 and 241, in which the two layers a and b having different refractive indexes may be repeatedly and/or alternatingly formed or stacked, as the lower polarizing plate 140. However, a transmittance of light in the longer wavelength range (red-based color) increases due to the feature of the reflective polarizing plates 141 and 241, so that a reddish phenomenon, in which red light is displayed on a screen, may occur.

Accordingly, in an exemplary embodiment of the present invention, the first and second compensation layers 151 and 153 may be formed by the positive (+) C plate and the negative (−) B plate having the reverse wavelength distribution feature, respectively, so that the blue region on a Poincare sphere may be designed to be far from a vanishing point. Accordingly, the light in the long wavelength range, which passes through the reflective polarizing plates 141 and 241, is converted into light in a short wavelength range (blue-based color), thereby minimizing the reddish phenomenon viewed on the screen.

FIGS. 6A, 6B, and 6C are diagrams illustrating a characteristic of a liquid crystal display device according to an exemplary embodiment of the present invention.

FIG. 6A is a diagram illustrating a change in brightness according to a viewing angle of the liquid crystal display device including a reflective polarizing plate, a liquid crystal layer in a PLS mode, and an upper polarizing plate. The upper polarizing plate may be formed by sequentially stacking a normal TAC layer, a polarizer, and a surface-processed TAC layer.

As illustrated in FIG. 6A, in the liquid crystal display device, a transmittance of light in a long wavelength range (red-based color) increases by the reflective polarizing plate used as a lower polarizing plate, which may generate red light on a liquid crystal display panel at a viewing angle of 0°, 90°, 180°, and 270°.

FIG. 6B is a diagram illustrating a change in brightness according to a viewing angle of the liquid crystal display device including the reflective polarizing plate illustrated in FIG. 3, a liquid crystal layer in a PLS mode, and the upper polarizing plate illustrated in FIG. 5. As illustrated in FIG. 6B, red light may decrease and blue light may increase at a viewing angle of 0°, 90°, 180°, and 270°.

FIG. 6C is a diagram illustrating a change in brightness according to a viewing angle of the liquid crystal display device including the reflective polarizing plate illustrated in FIG. 4, a liquid crystal layer in a PLS mode, and the upper polarizing plate illustrated in FIG. 5. As illustrated in FIG. 6C, red light may decrease and blue light may increase at a viewing angle of 0°, 90°, 180°, and 270°.

In an exemplary embodiment of the present invention, the first and second compensation layers 151 and 153 formed by the positive (+) C plate and the negative (−) B plate having the reverse wavelength distribution feature may be added to the upper polarizing plate 150, which may allow the reddish phenomenon by the reflective polarizing plates 141 and 241 to be compensated.

When a viewing angle in the x-axis direction increases in the liquid crystal display device adopting the reflective polarizing plate, a refractive index of the second layer of the reflective polarizing plate decreases and a Bragg reflection wavelength is shifted to a short wavelength, which increases transmittance of a long wavelength.

Accordingly, red light corresponding to a long wavelength may pass through the reflective polarizing plate and be displayed on the liquid crystal display panel. The reddish phenomenon that a user views as a red-based image may occur.

According to an exemplary embodiment of the present invention, it is possible to minimize the reddish phenomenon generated by the reflective polarizing plate, the lower polarizing plate, by designing the upper polarizing plate to include the positive (+) C plate and the negative (−) B plate having reverse wavelength distribution feature.

Further, according to an exemplary embodiment of the present invention, two layers having different refractive indexes may be repeatedly and/or alternatingly formed or stacked to allow some light to pass through and reflecting the remaining light, thereby improving efficiency of usage of light provided by the backlight.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device, comprising:
    a first substrate and a second substrate facing each other at a predetermined interval;
    a reflective polarizing plate disposed under the first substrate, and including a first refractive index layer and a second refractive index layer having different refractive indexes and being alternately stacked;
    a first compensation layer and a second compensation layer sequentially stacked on the second substrate;
    an upper polarizing plate comprising a polarizing layer disposed on the second compensation layer; and
    a liquid crystal layer disposed between the first and second substrates,
    wherein the reflective polarizing plate comprises a first group layer and second group layer, the first and second group layers respectively comprising a first refractive index layer and a second refractive index layer repeatedly stacked, and
    wherein a buffer layer is disposed between the first group layer and the second group layer.

2. The liquid crystal display device of claim 1, wherein the first compensation layer comprises a positive C plate, and the second compensation layer comprises a negative B plate.

3. The liquid crystal display device of claim 2, wherein the first compensation layer is configured to have a phase difference in a thickness direction within a range of −200 nm to −40 nm, and
    the second compensation layer is configured to have a phase difference value in a thickness direction within a range of 40 nm to 160 nm and a front phase difference value in a range of 40 to 160 nm.

4. The liquid crystal display device of claim 1, wherein the reflective polarizing plate comprises a third group layer, the third group layer comprising the first refractive index layer and the second refractive index layer repeatedly stacked, and
    a buffer layer is disposed between the second group layer and the third group layer.

5. The liquid crystal display device of claim 4, wherein a thickness ratio of a first refractive index layer to a second refractive index layer in the third group layer is different from a thickness ratio of a first refractive index layer to a second refractive index layer in the first and second group layers.

6. The liquid crystal display device of claim 5, wherein the first refractive index layer and second refractive index layer in the third group layer have the same thickness.

7. The liquid crystal display device of claim 1, wherein a thickness ratio of a first refractive index layer to a second refractive index layer in the first group layer is the same as a thickness ratio of a first refractive index layer to a second refractive index layer in the second group layer.

8. The liquid crystal display device of claim 1, wherein the first and second compensation layers are configured to compensate for a phase difference value in a thickness direction of the reflective polarizing plate.

9. The liquid crystal display device of claim 8, wherein the first and second compensation layers comprises tri-acetyl cellulose (TAC).

10. The liquid crystal display device of claim 8, wherein the polarizing layer comprises a polarizer (poly-vinyl alcohol: PVA) disposed on the second compensation layer, and a surface processed passivation layer (tri-acetyl cellulose: TAC) disposed on the polarizer.

11. The liquid crystal display device of claim 1, wherein the liquid crystal layer comprises in-plane liquid crystal.

* * * * *